W. J. GALT, Jr.
SNAP FASTENER SOCKET.
APPLICATION FILED DEC. 30, 1915.

1,220,622.

Patented Mar. 27, 1917.

Witness
Daniel Webster Jr.

Inventor
William J. Galt Jr.
By Cyrus N. Anderson
Attorney

UNITED STATES PATENT OFFICE.

WILLIAM J. GALT, JR., OF PHILADELPHIA, PENNSYLVANIA, ASSIGNOR TO THE DE LONG HOOK AND EYE COMPANY, OF PHILADELPHIA, PENNSYLVANIA, A CORPORATION OF PENNSYLVANIA.

SNAP-FASTENER SOCKET.

1,220,622.   Specification of Letters Patent.   Patented Mar. 27, 1917.

Application filed December 30, 1915. Serial No. 69,338.

*To all whom it may concern:*

Be it known that I, WILLIAM J. GALT, Jr., a citizen of the United States, residing in the city and county of Philadelphia, State of Pennsylvania, have invented certain new and useful Improvements in Snap-Fastener Sockets, of which the following is a specification.

My invention relates to improvements in sockets for snap fasteners of the character in which a spring, separate from the elements constituting or forming the body of the socket, is employed as a means for retaining the ball member and socket member in assembled relation with respect to each other.

The principal object of my invention is to provide a socket member which is relatively flat and thin and which is reversible.

A further object is to provide an extremely simple and practical device which may be economically manufactured. Other objects and advantages of my invention will be referred to in the detailed description thereof which follows or will be apparent from such description.

In the accompanying drawings I have illustrated one form of a convenient embodiment of my invention but it will be understood that my invention is susceptible of embodiment in other forms of construction within the scope of the claims.

In the drawings:—

Figure 1:
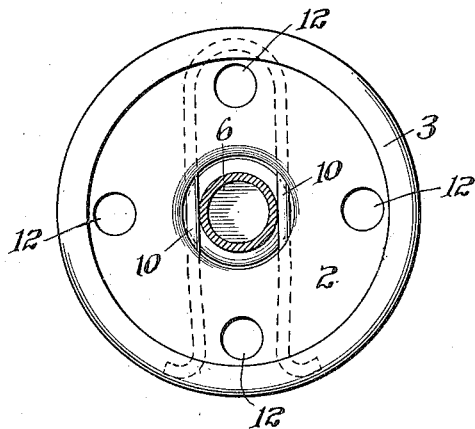
Figure 1 is a horizontal sectional view taken on the line 1—1 of Fig. 2.
Figure 2:
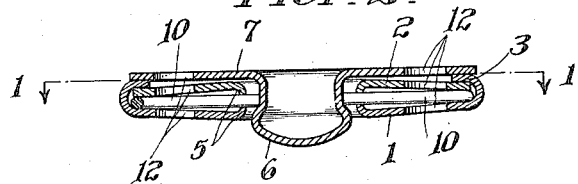
Fig. 2 is a transverse sectional view showing a socket embodying my invention and a ball member in assembled relation.

Referring to the drawings, 1 and 2 designate the body plates comprised in the construction of the socket member of the fastener. The outer circumferential edge of the plate 1 is bent transversely and inwardly as shown at 3, the inner edge of said inwardly bent portion overlapping or overlying the outer edge of the plate 2, the two plates being thereby permanently secured together. It will be understood, of course, that instead of bending the plate 1 transversely and inwardly the other plate 2 may have been so bent in which case the plate 1 would correspond to the plate 2. Each of the plates is provided at its center with an opening, such openings being in alinement or in registry and constituting the socket opening of the fastener. The edge of each of these openings is bent inwardly as shown at 5 so as to provide for the ready insertion of the head or ball 6 of the ball member 7 of the fastener.

Figure 3:
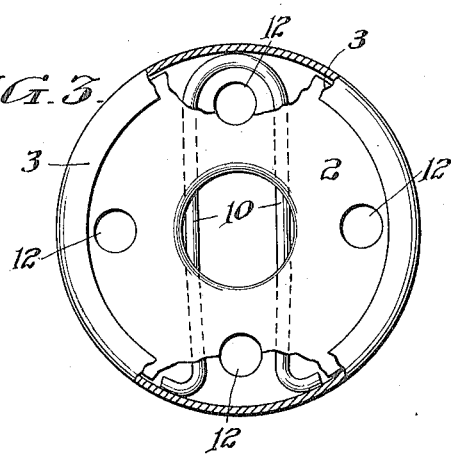
Fig. 3 is a top plan view of the socket with the ball member removed and with portions of the body plates of which the socket member is constructed broken away.

Situated intermediate the plates 1 and 2 and held securely in position thereby is a spring 10 for engaging the head or ball of the ball member 7 of the fastener to hold the ball and socket members of the fastener in assembled relation and also to permit ready assembling and disassembling of the same. As shown in Figs. 1 and 3 the spring consists of a wire bent into yoke shape, as shown, the opposite ends thereof contacting with diametrically opposed inner edge portions of the socket member of the fastener. The central portions of the opposite sides of the yoke-shaped spring member extend through diametrically opposed portions of the socket opening.

It will be understood that in assembling the members of the fastener the head 6 is placed in proper relation to the socket opening of the socket member and pressed toward the latter. The rounded edge of said head bearing against the opposite side portions of the spring 10 spreads the said portions so that the said head may pass between the same. Such portions then return to normal position adjacent to or in contact with the neck portion of the head or ball of the ball member of the fastener. Such spring, therefore, operates to hold the said members in assembled relation but yields with sufficient readiness and ease to permit separation of the members without injury to the fabric of a garment to which the respective members may be attached.

In order to provide means for attaching the members of the fastener to the material of a garment I provide the usual thread openings 12.

It will be apparent from an inspection of the drawing that by my invention I have provided a socket member which is reversible and which is relatively flat and thin whereby unsightly protuberances or projections are avoided. Such protuberances or projections are not only unsightly but in the case of wash garments which are ironed have an injurious effect upon garments.

I claim:—

1. A reversible socket member for a snap fastener comprising plates arranged in general parallel relation to each other, the outer circumferential edge of one of said plates being bent transversely and inwardly to overlie the outer edge of the other of said plates whereby the said plates are secured together and each of the said plates having central openings in alinement or registry with each other the edges of said openings being bent inwardly toward each other whereby the head of the ball member may be inserted from either side, said openings forming the socket opening of said socket member, and a spring having portions extending in parallel relation to the said plate members and being clamped therebetween said portions cutting the said socket opening at diametrically opposed points, substantially as described.

2. A reversible socket member for a snap fastener comprising plates arranged in general parallel relation to each other, the outer circumferential edge of one of said plates being bent transversely and inwardly to overlie the outer edge of the other of said plates whereby the said plates are secured together and the said plates having central alined openings constituting the socket of said member, the edges of the openings in the respective plates being bent inwardly toward each other whereby the head of the ball member may be inserted from either side, and a yoke-shaped spring having its opposite ends seated against the inner surface of the circumferential bent edge above referred to, said spring being held between the said plates and the side portions of said spring cutting the socket opening of said socket member at diametrically opposed points, substantially as described.

In testimony that I claim the foregoing as my invention I have hereunto signed my name this 27th day of December, A. D. 1915.

WILLIAM J. GALT, Jr.

Copies of this patent may be obtained for five cents each, by addressing the "Commissioner of Patents, Washington, D. C."